United States Patent
Zhang et al.

(10) Patent No.: US 10,326,581 B2
(45) Date of Patent: Jun. 18, 2019

(54) COMMUNICATING A HIGH PRIORITY MESSAGE IN A COMMUNICATION CHANNEL OF A WIRELESS COMMUNICATION NETWORK BASED ON A TDMA PROTOCOL

(71) Applicants: Guoxia Zhang, Shanghai (CN); Qingshan Zhang, Shanghai (CN); Zeng Yang, Shanghai (CN)

(72) Inventors: Guoxia Zhang, Shanghai (CN); Qingshan Zhang, Shanghai (CN); Zeng Yang, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 92 days.

(21) Appl. No.: 14/901,701

(22) PCT Filed: Jul. 3, 2013

(86) PCT No.: PCT/CN2013/078718
§ 371 (c)(1),
(2) Date: Dec. 28, 2015

(87) PCT Pub. No.: WO2015/000144
PCT Pub. Date: Jan. 8, 2015

(65) Prior Publication Data
US 2016/0197717 A1 Jul. 7, 2016

(51) Int. Cl.
*H04L 5/22* (2006.01)
*H04L 12/851* (2013.01)
(Continued)

(52) U.S. Cl.
CPC ............ *H04L 5/22* (2013.01); *H04B 7/2656* (2013.01); *H04L 47/245* (2013.01); *H04W 72/0446* (2013.01)

(58) Field of Classification Search
CPC ......... H04L 5/22; H04L 47/245; H04L 47/10; H04L 47/50; H04L 47/14; H04L 47/2433;
(Continued)

(56) References Cited

U.S. PATENT DOCUMENTS 5,465,253 A * 11/1995 Rahnema ................. H04J 3/12
370/349
9,591,641 B2 * 3/2017 Zhao ................. H04W 72/1221
(Continued)

FOREIGN PATENT DOCUMENTS

CN 101635965 A 1/2010
EP 2 256 993 A1 1/2010
(Continued)

OTHER PUBLICATIONS

International Search Report dated Apr. 16, 2014 in Application No. PCT/CN2013/078718.
(Continued)

*Primary Examiner* — Peter Chen
(74) *Attorney, Agent, or Firm* — Artegis Law Group, LLP

(57) ABSTRACT

A method and a system for communicating a high priority message in a vehicular ad hoc network is provided. In the communication channel, time slots are defined, and N successive time slots constitute one cycle, where m th time slot of each cycle is reserved for transmitting a pre-emption message. The method may include: selecting a sub-frame, transmitted in a first q th time slot, having a priority lower than that of the high priority message; transmitting in a first m th time slot after the first q th time slot a pre-emption message indicating that a second q th time slot, which is after the first m th time slot, will be occupied to transmit the high priority message; and transmitting in the second q th time slot the high priority message. By using the method and system, messages with higher priority can be transmitted timely even under very congested conditions.

12 Claims, 4 Drawing Sheets

(51) Int. Cl.
*H04B 7/26* (2006.01)
*H04W 72/04* (2009.01)

(58) Field of Classification Search
CPC .......... H04L 47/24; H04L 2012/6464; H04W 72/1242; H04W 72/0446; H04W 72/10; H04W 72/08; H04W 72/00; H04W 72/085; H04W 28/26; H04B 7/2643; H04B 7/2656; H04J 14/08; H04J 3/0647; H04J 3/00
See application file for complete search history.

(56) References Cited

U.S. PATENT DOCUMENTS

2002/0126692 A1* 9/2002 Haartsen ............... H04W 72/10
370/450
2006/0109864 A1* 5/2006 Oksman ................. H04L 7/041
370/474
2009/0022136 A1* 1/2009 Joshi .................... H04B 7/2123
370/348
2011/0013601 A1* 1/2011 Cerasa ................. H04W 28/26
370/336

FOREIGN PATENT DOCUMENTS

WO 2009014900 A2 1/2009
WO 2012142114 A1 10/2012

OTHER PUBLICATIONS

Cozzetti, "Scalability and QoS in MS-Aloha VANETs: Forced Slot Re-Usse Versus Pre-Emption", 2011 14th International IEEE Conference on Intelligent Transportation Systems, Washington, D.C. USA, Oct. 5-7, 2011, pp. 1759-1766.
Extended European Search Report for Application No. 13888751.8, dated Jan. 26, 2017.

* cited by examiner

COMMUNICATING A HIGH PRIORITY MESSAGE IN A COMMUNICATION CHANNEL OF A WIRELESS COMMUNICATION NETWORK BASED ON A TDMA PROTOCOL

CROSS-REFERENCE TO RELATED APPLICATIONS

The present application is a national stage application of the international application titled, "COMMUNICATING A HIGH PRIORITY MESSAGE IN A COMMUNICATION CHANNEL OF A WIRELESS COMMUNICATION NETWORK BASED ON A TDMA PROTOCOL," filed on Jul. 3, 2013 and having application number PCT/CN2013/078718. The subject matter of this related application is hereby incorporated herein by reference.

TECHNICAL FIELD

The present disclosure generally relates to communicating a high priority message in a communication channel of a wireless communication network based on a time division multiple access protocol.

BACKGROUND

In a vehicular ad hoc network based on a slotted ALOHA protocol, vehicles may exchange information with surrounding vehicles, which typically includes event-driven Decentralized Environmental Notification Messages (DENMs), and periodic Cooperative Awareness Messages (CAMs), etc. In an environment congested with nodes, if a node has a high priority event-driven DENM to be broadcast and there is no vacant time slot to broadcast the message, safety problem may be caused. To solve this problem, a preemption mechanism is proposed by H. Agustin Cozzetti et al in "Scalability and QoS in MS-Aloha VANETs: Forced Slot Re-Use Versus Pre-Emption". In this solution, when node A needs to broadcast a high priority message in a channel, it analyzes the channel for a whole frame period first. If all time slots are occupied, then node A scans Frame Information fields (FIs) in the frame to select a sub-frame with lower priority which is transmitted in a time slot, and preempts the time slot.

SUMMARY

However, the conventional preemption solution would cause a collision, as a result, timely delivery of high priority messages can not be guaranteed. Therefore, a more robust method for communicating a high priority message in a communication channel of a wireless communication network based on a time division multiple access protocol is needed.

In one embodiment, a method for communicating a high priority message in a communication channel of a wireless communication network based on a time division multiple access protocol is provided. In the communication channel, time slots are defined, and N successive time slots constitute one cycle, where $m^{th}$ time slot of each cycle is reserved for transmitting a pre-emption message. The method may include: selecting a sub-frame, transmitted in a first $q^{th}$ time slot, having a priority lower than that of the high priority message; transmitting in a first $m^{th}$ time slot after the first $q^{th}$ time slot a pre-emption message indicating that a second $q^{th}$ time slot, which is after the first $m^{th}$ time slot, will be occupied to transmit the high priority message; and transmitting in the second $q^{th}$ time slot the high priority message.

In some embodiments, if the first $q^{th}$ time slot is in a first cycle and q is greater than m, the first $m^{th}$ time slot and the second $q^{th}$ time slot may be in a second cycle which is the next cycle after the first cycle.

In some embodiments, if the first $q^{th}$ time slot is in a first cycle and m is greater than q, the first $m^{th}$ time slot may be in a second cycle which is the next cycle after the first cycle, and the second $q^{th}$ time slot may be in a third cycle which is the next cycle after the second cycle.

In some embodiments, if the first $q^{th}$ time slot is in a first cycle and $m^{th}$ time slot is the last time slot, the first $m^{th}$ time slot may be in the first cycle, and the second $q^{th}$ time slot may be in a second cycle which is the next cycle after the first cycle.

In some embodiments, the pre-emption message may include a slot number for indicating which slot will be occupied by a high priority message; an identity of a node, which node transmits the pre-emption message; and a priority of the high priority message.

In some embodiments, the time division multiple access protocol may be one of a RR-ALOHA protocol, a RR-ALOHA+ protocol and a MS-ALOHA protocol. The wireless communication network may be a Vehicular Ad-Hoc Network.

In one embodiment, a system for communicating a high priority message in a communication channel of a wireless communication network based on a time division multiple access protocol is provided. In the communication channel, time slots are defined, and N successive time slots constitute one cycle, where $m^{th}$ time slot of each cycle is reserved for transmitting a pre-emption message. The system may include a processing device and a communication device, where the processing device may be configured to select a sub-frame, transmitted in a first $q^{th}$ time slot, having a priority lower than that of the high priority message; to control the communication device to transmit in a first $m^{th}$ time slot after the first $q^{th}$ time slot a pre-emption message indicating that a second $q^{th}$ time slot, which is after the first $m^{th}$ time slot, will be occupied to transmit the high priority message; and to control the communication device to transmit in the second $q^{th}$ time slot the high priority message.

In some embodiments, if the first $q^{th}$ time slot is in a first cycle and q is greater than m, the first $m^{th}$ time slot and the second $q^{th}$ time slot may be in a second cycle which is the next cycle after the first cycle.

In some embodiments, if the first $q^{th}$ time slot is in a first cycle and m is greater than q, the first $m^{th}$ time slot may be in a second cycle which is the next cycle after the first cycle, and the second $q^{th}$ time slot may be in a third cycle which is the next cycle after the second cycle.

In some embodiments, if the first $q^{th}$ time slot is in a first cycle and $m^{th}$ time slot is the last time slot, the first $m^{th}$ time slot may be in the first cycle, and the second $q^{th}$ time slot may be in a second cycle which is the next cycle after the first cycle.

In some embodiments, the pre-emption message may include a slot number for indicating which slot will be occupied by a high priority message; an identity of a node, which node transmits the pre-emption message; and a priority of the high priority message.

In some embodiments, the time division multiple access protocol may be one of a RR-ALOHA protocol, a RR-ALOHA+ protocol and a MS-ALOHA protocol. The wireless communication network may be a Vehicular Ad-Hoc Network.

In one embodiment, a system for communicating a high priority message in a communication channel of a wireless communication network based on a time division multiple access protocol is provided. In the communication channel, time slots are defined, and N successive time slots constitute one cycle, where $m^{th}$ time slot of each cycle is reserved for transmitting a pre-emption message. The system may include: a processing device for selecting a sub-frame, transmitted in a first $q^{th}$ time slot, having a priority lower than that of the high priority message; and, a communication device for transmitting, based on the selection of the processing device, in a first $m^{th}$ time slot after the first $q^{th}$ time slot a pre-emption message indicating that a second $q^{th}$ time slot, which is after the first $m^{th}$ time slot, will be occupied to transmit the high priority message; and transmitting in the second $q^{th}$ time slot the high priority message.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
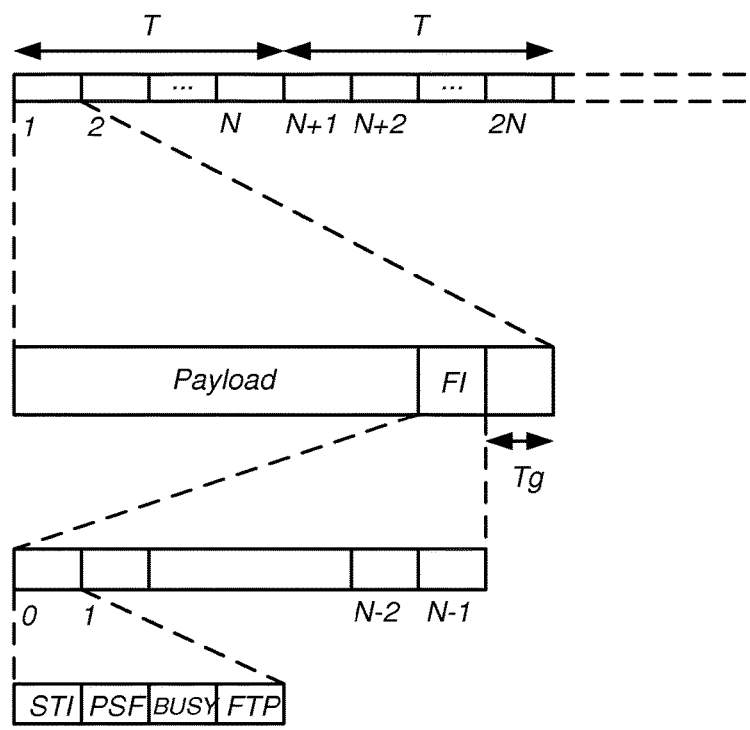
FIG. 1 schematically illustrates a conventional data frame structure of RR-ALOHA protocol.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Vehicles in vehicular ad hoc networks (VANETs) may exchange information with surrounding vehicles using Time Division Multiple Access (TDMA) based protocol. One of the most representative TDMA based protocol suitable for VANETs is RR-ALOHA based protocol. The RR-ALOHA based protocol may include three different versions, which may be a RR-ALOHA protocol, a RR-ALOHA+ protocol or a MS-ALOHA protocol.

A conventional data frame structure of RR-ALOHA protocol is schematically illustrated in FIG. 1. Referring to FIG. 1, a data frame includes N sub-frames. In RR-ALOHA protocol, time slots having a predetermined length are defined, and each sub-frame is transmitted in one time slot. N successive time slots constitute a cycle, and a data frame can be transmitted in one cycle. N is a positive integer greater than two. A Node in a Vehicular Ad-Hoc Network (e.g., a vehicle) may need a slot as its basic channel (BCH) for broadcasting certain message(s).

Referring to FIG. 1, a sub-frame may include a payload, a frame information (FI) field and a Guard Time (Tg). A frame information field includes N sub-frame information fields which correspond to the N time slots of a cycle, respectively. For example, referring to FIG. 1, the sub-frame information field labeled "0" (FI 0) may correspond to time slot 1, and the sub-frame information field labeled "1" (FI 1) corresponds to time slot 2, and so on. A sub-frame information field may be used to indicate status of a corresponding time slot.

As shown in FIG. 1, a sub-frame information field may include: a Source Temporary Identifier (STI) field having eight bits; a Priority-Status Field (PSF) having two bits; a BUSY field having one bit; and a point-to-point transmission identifier (FTP) field having one bit. The STI field is used for indicating which vehicle occupies a time slot corresponding to the current sub-frame information field. The PSF field is used for indicating a priority of a sub-frame which is transmitted in a time slot corresponding to the current sub-frame information field. The BUSY field is used for indicating whether a time slot corresponding to the current sub-frame information field is busy or not. And the FTP field is used for indicating whether a sub-frame, transmitted in a time slot corresponding to the current sub-frame information field, is a broadcast packet or not.

In greater detail, the BUSY field may be set to "1" if the sender node considers the corresponding time slot occupied; otherwise, it may be set to "0". In addition, in the case where the corresponding time slot is occupied, the STI field may identify the node that occupies said time slot.

Typically, the inter-vehicle communication may include four kinds of messages, which are shown as follows in the descending order of priority:

DENMs (Decentralized Environmental Notification Messages). This is event-driven for alerting drivers that an emergency takes place;

CAMs (Cooperative Awareness Messages). This is for conveying vehicle status information periodically;

Messages for Traffic applications. This is for carrying out traffic management and providing drivers with the traffic situation and road information; and Messages for Non-safety applications. This is for ordinary comfort or entertainment applications.

DENMs have the highest priority as they are generated under emergency conditions, and CAMs come second as they are periodical messages. As the fourth messages are not involved in safety, they have the lowest priority.

Figure 2:
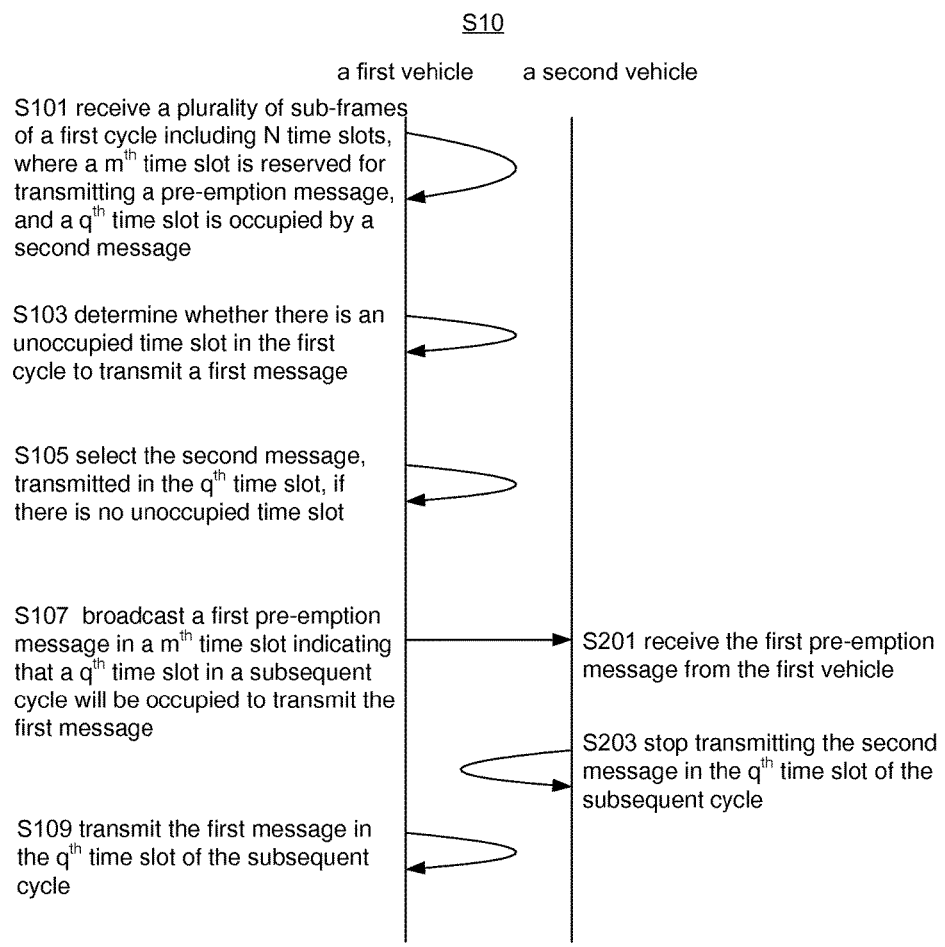
FIG. 2 illustrates a schematic flow chart of a communication method S10 in a vehicular ad hoc network according to one embodiment.

Hereinafter, embodiments of a method for communicating a high priority message in a communication channel of a wireless communication network based on a RR-ALOHA protocol will be described in detail in accompany with FIG. 1 and FIG. 2. FIG. 2 illustrates a schematic flow chart of a communication method S10 in a vehicular ad hoc network according to one embodiment.

In S101, a first vehicle receives a plurality of sub-frames of a first cycle including N time slots, where a $m^{th}$ time slot is reserved for transmitting a pre-emption message, and a $q^{th}$ time slot is occupied by a second message.

According to one embodiment, one time slot in each cycle, for example, $m^{th}$ time slot, may be reserved for transmitting a pre-emption message, which may be referred to as a pre-emption slot.

In some embodiments, a second vehicle may transmit a second message in the $q^{th}$ time slot of the first cycle. Generally, if a vehicle needs to transmit a message, it may select an unoccupied time slot based on received frame information, and then transmit the message in the selected time slot. As described above, the second message contains frame information (FI) indicating that the $q^{th}$ time slot in the first cycle is occupied by the second vehicle to transmit the second message. In this case, for example, the BUSY field corresponding to the $q^{th}$ time slot is set to "1", and the STI field corresponding to the $q^{th}$ time slot is set to an identity of the second vehicle occupying the $q^{th}$ time slot.

Based on the received sub-frames of the first cycle, the first vehicle can obtain sub-frame information corresponding to the $q^{th}$ time slot, and know the status of the $q^{th}$ time slot of the first cycle.

In S103, the first vehicle determines whether there is an unoccupied time slot in the first cycle to transmit a first message. In some embodiments, the first vehicle may scan the first cycle except the pre-emption slot to determine whether there is an unoccupied time slot in the first cycle.

In some embodiments, if there is a free time slot in the first cycle, the first vehicle may reserve the free time slot to transmit the first message.

In S105, the first vehicle selects the second message, transmitted in the $q^{th}$ time slot, if there is no unoccupied time slot. The first vehicle tries to transmit its first message in a $q^{th}$ time slot in subsequent cycle(s).

There is a situation that all the time slots in the first cycle are occupied. Specifically, each time slot except the pre-emption slot in the first cycle is occupied. In order to transmit the first message in time, the first vehicle may select a sub-frame, for example, the second message which is transmitted in the $q^{th}$ time slot in the first cycle, and transmit its first message in a $q^{th}$ time slot in subsequent cycle(s). To do this successfully, it is required that the first message has a priority higher than that of the second message which is transmitted in the $q^{th}$ time slot of the first cycle.

In some embodiments, a sub-frame having the lowest priority, transmitted in a time slot, may be selected by the first vehicle which will transmit its high priority message in the time slot.

In S107, the first vehicle broadcasts a first pre-emption message in a $m^{th}$ time slot indicating that a $q^{th}$ time slot in a subsequent cycle will be occupied to transmit the first message.

Figure 3:
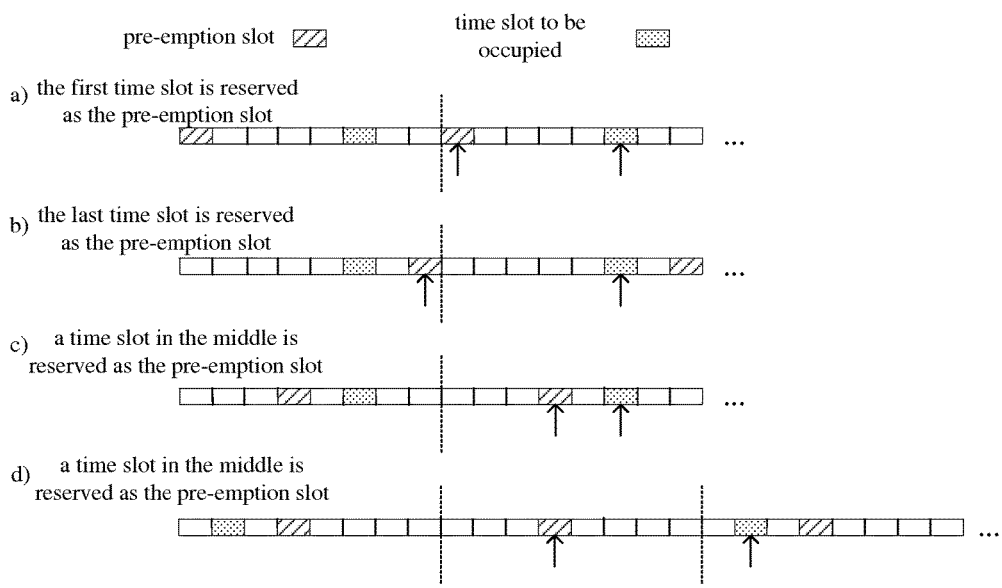
FIG. 3 schematically illustrates examples of transmission of pre-emption message and high priority message.

Reservation of a time slot for transmitting a pre-emption message may have several different cases. As shown in FIG. 3, a slot marked with oblique lines represents a pre-emption slot ($m^{th}$ time slot), and a slot marked with dots represents a time slot which will be occupied by a higher priority message ($q^{th}$ time slot).

First, the first time slot in each cycle may be reserved for transmitting a pre-emption message. In this case, the selected $q^{th}$ time slot is always after the first time slot in a same cycle, that is, q is greater than m.

Second, the last time slot in each cycle may be reserved for transmitting a pre-emption message. In this case, the selected $q^{th}$ time slot is always prior to the last time slot in a same cycle, that is, m is greater than q. And, the first vehicle may scan the whole first cycle except the last time slot.

Third, a time slot in the middle of each cycle may be reserved for transmitting a pre-emption message. In this case, the selected $q^{th}$ time slot may be prior to or after the time slot in a same cycle.

Figure 4:
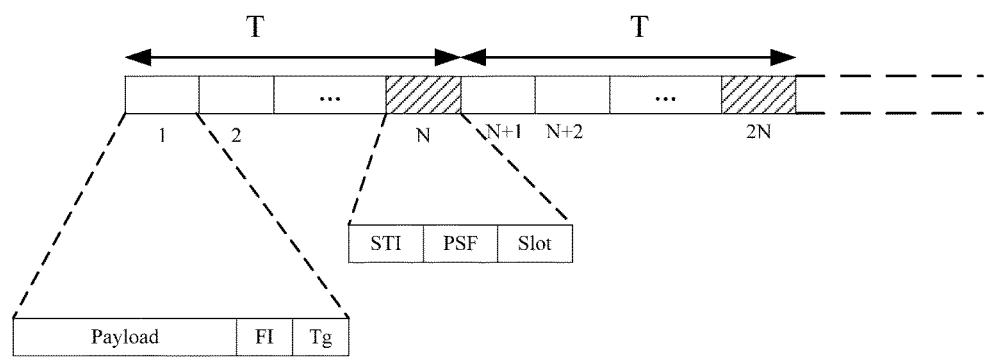
FIG. 4 schematically illustrates a data frame structure of RR-ALOHA protocol according to one embodiment.

FIG. 4 schematically illustrates a data frame structure of RR-ALOHA protocol according to one embodiment. Referring to FIG. 4, the last time slot ($N^{th}$ time slot) of each cycle is reserved for transmitting a pre-emption message. In some embodiments, the pre-emption message may include: a Slot field for indicating which time slot will be occupied by a high priority message, e.g., a $q^{th}$ time slot; a STI field for indicating an identity of a vehicle transmitting the pre-emption message, e.g., the first vehicle; and a PSF field for indicating the priority of the high priority message. The STI field may have 8 bits and the PSF field may have 2 bits.

In some embodiments, to identify a priority of a sub-frame, the PSF field may be defined as follows:
PSF is equal to 00, which represents DENMs;
PSF is equal to 01, which represents CAMs;
PSF is equal to 10, which represents Messages for Traffic applications; and
PSF is equal to 11, which represents Messages for Non-safety applications.

In S201, the second vehicle in the network receives the first pre-emption message from the first vehicle. Upon receiving the pre-emption message, the second vehicle may know that the occupation of the $q^{th}$ time slot with the second message will be preempted in subsequent cycle with the first message by the first vehicle, as the first message has a higher priority than the second message.

In S203, the second vehicle stops transmitting the second message in the $q^{th}$ time slot of the subsequent cycle.

The second vehicle may agree to quit the occupation of the $q^{th}$ time slot with the second message because it knows that its second message has a lower priority than that of the first message based on the first pre-emption message received from the first vehicle. Therefore, the $q^{th}$ time slot in the subsequent cycle is unlocked to the first message. As such, a collision on the $q^{th}$ time slot which may be caused using the conventional preemption solution can be avoided.

In S109, the first vehicle transmits the first message in the $q^{th}$ time slot of the subsequent cycle. As reservation of a time slot for transmitting a pre-emption message may have different cases, transmission of pre-emption message and high priority message may accordingly have different cases, which are illustrated in FIG. 3 a) to d), respectively.

Referring to FIG. 3 a), if the first time slot in each cycle is reserved for transmitting a pre-emption message, the first vehicle broadcasts the first pre-emption message in the first time slot of a second cycle, which is the next cycle after the first cycle, indicating that a $q^{th}$ time slot in the second cycle will be occupied to transmit the first message. And the first vehicle transmits the first message in the $q^{th}$ time slot of the second cycle.

Referring to FIG. 3 b), if the last time slot in each cycle is reserved for transmitting a pre-emption message, the first vehicle broadcasts the first pre-emption message in the last time slot of the first cycle indicating that a $q^{th}$ time slot in a second cycle, which is the next cycle after the first cycle, will be occupied to transmit the first message. And the first vehicle transmits the first message in the $q^{th}$ time slot of the second cycle.

In some embodiments, if a time slot in the middle of each cycle is reserved for transmitting a pre-emption message, there are further two cases for transmission of the first message.

Referring to FIG. 3 c), if the $q^{th}$ time slot is after the $m^{th}$ time slot in the first cycle (namely, q is greater than m), the first vehicle broadcasts the first pre-emption message in a $m^{th}$ time slot of a second cycle, which is the next cycle after the first cycle, indicating that a $q^{th}$ time slot in the second cycle will be occupied to transmit the first message. And the first vehicle transmits the first message in the $q^{th}$ time slot of the second cycle.

Referring to FIG. 3 d), if the $q^{th}$ time slot is prior to the $m^{th}$ time slot in the first cycle (namely, m is greater than q), the first vehicle broadcasts the first pre-emption message in a $m^{th}$ time slot of a second cycle, which is the next cycle after the first cycle, indicating that a $q^{th}$ time slot in a third cycle, which is the next cycle after the second cycle, will be occupied to transmit the first message. And the first vehicle transmits the first message in the $q^{th}$ time slot of the third cycle.

After the first vehicle transmits the first message, vehicles in the network may know the change of sub-frame transmitted in the $q^{th}$ time slot, and update their frame information.

Since the second message, transmitted in the $q^{th}$ time slot of the first cycle, is preempted by the first vehicle with the first message having a higher priority, the second vehicle may scan a next cycle after the first cycle to select an unoccupied time slot to transmit its message.

According to one embodiment of the present disclosure, a system for communicating a high priority message in a communication channel of a wireless communication network based on a time division multiple access protocol is provided. In the communication channel, time slots are defined, and N successive time slots constitute one cycle, where $m^{th}$ time slot of each cycle is reserved for transmitting a pre-emption message. The system for communicating a high priority message may be mounted on a vehicle and may communicate using a RR-ALOHA based protocol. The RR-ALOHA based protocol may include three different versions, which may be a RR-ALOHA protocol, a RR-ALOHA+ protocol or a MS-ALOHA protocol.

In some embodiments, the system may include a processing device and a communication device. The processing device may be configured to select a sub-frame, transmitted in a first $q^{th}$ time slot, having a priority lower than that of the high priority message. The communication device may be configured to transmit, based on the selection of the processing device, in a first $m^{th}$ time slot after the first $q^{th}$ time slot a pre-emption message indicating that a second $q^{th}$ time slot, which is after the first $m^{th}$ time slot, will be occupied to transmit the high priority message; and to transmit in the second $q^{th}$ time slot the high priority message.

In some embodiments, the processing device and the communication device, controlled by the processing device, may be configured to perform S101 to S109 of the method S10. In some embodiments, the processing device may be a CPU, a DSP etc, or any combination thereof.

By using the method and system according to the above embodiments, messages with higher priority, such as event-driven DENMs or CAMs can be transmitted timely even under very congested conditions.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for communicating a high priority message in a communication channel of a wireless communication network based on a time division multiple access protocol, the method comprising:
   selecting a sub-frame, transmitted in a first $q^{th}$ time slot of a first cycle, having a priority lower than a priority associated with the high priority message, wherein time slots are defined in the communication channel, and N successive time slots constitute one cycle, and wherein an $m^{th}$ time slot of each cycle is reserved for transmitting a pre-emption message;
   transmitting in a first $m^{th}$ time slot after the first $q^{th}$ time slot a pre-emption message indicating that a second $q^{th}$ time slot, occurring after the first $m^{th}$ time slot, in a subsequent cycle, is to be occupied to transmit the high priority message, wherein the pre-emption message comprises a priority of the high priority message; and
   transmitting in the second $q^{th}$ time slot of the subsequent cycle the high priority message.

2. The method according to claim 1, where, if the first $q^{th}$ time slot occurs in a first cycle and q is greater than m, then the first $m^{th}$ time slot and the second $q^{th}$ time slot occur in a second cycle that is a next cycle after the first cycle.

3. The method according to claim 1, where, if the first $q^{th}$ time slot occurs in a first cycle and m is greater than q, then the first $m^{th}$ time slot is in a second cycle that is a next cycle after the first cycle, and the second $q^{th}$ time slot occurs in a third cycle that is a next cycle after the second cycle.

4. The method according to claim 1, where, if the first $q^{th}$ time slot occurs in a first cycle and an $m^{th}$ time slot is the last time slot, then the first $m^{th}$ time slot occurs in the first cycle, and the second $q^{th}$ time slot occurs in a second cycle that is a next cycle after the first cycle.

5. The method according to claim 1, where the pre-emption message further comprises (i) a time slot number for indicating which time slot is to be occupied by a high priority message; and (ii) an identity of a node that transmits the pre-emption message.

6. The method according to claim 1, where the time division multiple access protocol is one of a RR-ALOHA protocol, a RR-ALOHA+ protocol and a MS-ALOHA protocol.

7. A system for communicating a high priority message in a communication channel of a wireless communication network based on a time division multiple access protocol, the system comprising:
   a processing device configured to select a sub-frame, transmitted in a first $q^{th}$ time slot of a first cycle, having a priority lower than a priority associated with the high priority message, wherein time slots are defined in the communication channel, and N successive time slots constitute one cycle, and wherein an $m^{th}$ time slot of each cycle is reserved for transmitting a pre-emption message; and
   a communication device configured to:
     transmit, based on the selection of the processing device, in a first $m^{th}$ time slot after the first $q^{th}$ time slot, a pre-emption message indicating that a second $q^{th}$ time slot, in a subsequent cycle, that occurs after the first $m^{th}$ time slot is to be occupied to transmit the high priority message, wherein the pre-emption message comprises a priority of the high priority message; and transmit in the second $q^{th}$ time slot of the subsequent cycle the high priority message.

8. The system according to claim 7, where, if the first $q^{th}$ time slot occurs in a first cycle and q is greater than m, then the first $m^{th}$ time slot and the second $q^{th}$ time slot occur in a second cycle that is a next cycle after the first cycle.

9. The system according to claim 7, where, if the first $q^{th}$ time slot is in a first cycle and m is greater than q, then the first $m^{th}$ time slot occurs in a second cycle that is a next cycle after the first cycle, and the second $q^{th}$ time slot is in a third cycle that is a next cycle after the second cycle.

10. The system according to claim 7, where, if the first $q^{th}$ time slot occurs in a first cycle and an $m^{th}$ time slot is the last time slot, then the first $m^{th}$ time slot occurs in the first cycle, and the second $q^{th}$ time slot occurs in a second cycle that is a next cycle after the first cycle.

11. The system according to claim 7, where the pre-emption message further comprises (i) a time slot number for indicating which time slot is to be occupied by a high priority message; and (ii) an identity of a node that transmits the pre-emption message.

12. The system according to claim 7, where the time division multiple access protocol is one of a RR-ALOHA protocol, a RR-ALOHA+ protocol and a MS-ALOHA protocol.

* * * * *